US012429137B2

(12) United States Patent
Anderson et al.

(10) Patent No.: US 12,429,137 B2
(45) Date of Patent: Sep. 30, 2025

(54) ROTATING PUMP SHAFT BARRIER SEAL

(71) Applicant: Viking Pump, Inc., Cedar Falls, IA (US)

(72) Inventors: Andrew Anderson, Cedar Falls, IA (US); Scott Meyer, Brandon, IA (US); Alfonso Johnson, Cedar Falls, IA (US)

(73) Assignee: Viking Pump, Inc., Cedar Falls, IA (US)

( * ) Notice: Subject to any disclaimer, the term of this patent is extended or adjusted under 35 U.S.C. 154(b) by 0 days.

(21) Appl. No.: 18/476,509

(22) Filed: Sep. 28, 2023

(65) Prior Publication Data
US 2024/0102481 A1    Mar. 28, 2024

Related U.S. Application Data

(60) Provisional application No. 63/410,736, filed on Sep. 28, 2022.

(51) Int. Cl.
*F16J 15/18* (2006.01)
*F04D 29/10* (2006.01)

(52) U.S. Cl.
CPC ............ *F16J 15/183* (2013.01); *F04D 29/10* (2013.01)

(58) Field of Classification Search
CPC ........ F16J 15/182; F16J 15/183; F16J 15/184; F04D 29/10; F04C 15/0038; F04B 53/164
See application file for complete search history.

(56) References Cited

U.S. PATENT DOCUMENTS

| | | | | |
|---|---|---|---|---|
| 2,486,939 A * | 11/1949 | Freund | ..................... | F16J 15/40 |
| | | | | 277/516 |
| 2,834,617 A | 5/1958 | Creasy | | |
| 4,560,173 A | 12/1985 | Adams et al. | | |
| 6,834,574 B2 | 12/2004 | Neumann | | |
| 8,366,114 B1 * | 2/2013 | Gruner | ..................... | F28F 9/00 |
| | | | | 277/510 |
| 9,188,242 B2 * | 11/2015 | Giove | ..................... | F16J 15/181 |
| 9,658,001 B2 * | 5/2017 | Gruner | ..................... | F28F 9/00 |

(Continued)

OTHER PUBLICATIONS

The International Search Report and the Written Opinion of the International Searching Authority, or the Declaration to related PCT Appln No. PCT/US2023/075313, dated Jan. 19, 2024, 10 pages.

(Continued)

*Primary Examiner* — Nicholas L Foster
(74) *Attorney, Agent, or Firm* — Tucker Ellis LLP; Michael G. Craig; Nathan C. Lovette

(57) ABSTRACT

One or more techniques and/or systems are disclosed for an improved barrier seal for use on a rotating shaft of a pump to mitigate leakage of fluids along the shaft. The body of the barrier seal may comprise a one-piece combined bushing and seal that can be selectably fastened to the pump bracket. Internal and external channels in the body can operably hold gaskets, internally dynamic seals, and externally static seals, inside the stuffing box of the pump bracket. A lubricant port can be disposed on a flange of the seal portion to provide lubricant to the interior of the barrier seal, which can also be fluidly coupled with the outside of the seal. A pressurized lubricating fluid can also help mitigate leakage of pumped fluid by pressurizing between static gaskets on the outside, and provide lubrication for the rotating shaft on the inside of the seal.

13 Claims, 11 Drawing Sheets

(56) References Cited

U.S. PATENT DOCUMENTS

| | | |
|---|---|---|
| 10,760,685 B2* | 9/2020 | Iehl .......................... F16J 15/18 |
| 11,168,794 B2 | 11/2021 | Mihm et al. |
| 11,566,616 B2* | 1/2023 | Iehl ...................... F16J 15/3284 |
| 2013/0139999 A1* | 6/2013 | Gruner ...................... F28F 9/00 |
| | | 165/53 |
| 2013/0299008 A1* | 11/2013 | Giove .................... F16J 15/181 |
| | | 137/247.13 |
| 2018/0100583 A1* | 4/2018 | Iehl .......................... F16J 15/18 |
| 2020/0400141 A1 | 12/2020 | Iehl et al. |

OTHER PUBLICATIONS

Viking Pump, "How the O-Pro Barrier Seal Works," Sep. 28, 2020 [retreievd on Jan. 8, 2024], Retrieved from the Internet: <https://www.youtube.com/watch?v=fcx2vHMTThc>.

* cited by examiner

ROTATING PUMP SHAFT BARRIER SEAL

This nonprovisional patent application claims priority to provisional application having application No. 63/410,736 filed on Sep. 28, 2022, which is incorporated herein by reference.

BACKGROUND

Fluid pumps are used to pump fluid, in myriad applications, typically using a pumping chamber that moves fluid between an inlet and outlet of the pump. A rotating pump has a rotating shaft that powers a rotor to pump fluid from a pump chamber. The location in the pump where the rotating shaft meets the rotor in the pump chamber is a source for leakage of the pumped fluid. Various types of sealing devices have been used to mitigate leakage of the pump fluid along the rotating shaft, while allowing for appropriate rotation of the shaft during operation.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for an improved barrier seal that can be disposed on a rotating shaft during operation to mitigate leakage of fluids along the shaft. A barrier seal described herein is a one-piece combined bushing and seal that can be selectably fastened to the pump bracket. Further, one or more internal and external channels can operably hold a gasket, in dynamic or static placement on the shaft, or inside the stuffing or seal box of the pump bracket. A lubricant port can be disposed on the flange of the gland portion to provide lubricant to the interior of the barrier seal, which can also be fluidly coupled with the outside of the seal. In this way, for example, a pressurized lubricating fluid can also help mitigate leakage of pumped fluid by pressurizing between static gaskets on the outside and provide lubrication for the rotating shaft on the inside of the seal.

In one implementation of a barrier seal that can be used in a stuffing box of a rotating shaft pump to mitigate pumped fluid leakage outside of the pumping chamber, a one-piece body can comprise a proximal end and a distal end. The body can comprise a bushing portion disposed at the distal end of the body, and a seal portion disposed at the proximal end of the body. The bushing portion can comprise a substantially constant outer diameter that is configured to operably fit inside a stuffing box of a target pump. Further, the bushing portion can comprise a uniform inner diameter that is configured to operably fit around a rotating shaft of the pump. In this implementation, an internal fluid port fluidly couples the interior of the bushing portion with the exterior of the bushing portion. In the bushing portion, an interior channel is disposed at the distal end around the interior wall, and the interior channel is configured to hold a dynamic gasket against the rotating shaft. Additionally, an exterior channel is disposed at the distal end around the exterior wall, and the exterior channel is configured to hold a static gasket against the interior of the stuffing box. Alternately, the channel can be disposed on the inner wall of the stuffing box to hold a static gasket against the exterior wall of the bushing portion.

In this implementation, the seal portion can comprise a flange that projects radially outward from a central longitudinal axis of the body. The seal portion also comprises a seal shoulder that is disposed on the distal side of the flange. The seal shoulder can comprise a larger outer diameter than that of the bushing portion, and can comprise an external channel that is configured to hold a static gasket against the interior of the stuffing box. Alternately, the channel may be disposed around the inner wall at the lip opening of the stuffing box to hold a static flat gasket or lip seal against the exterior wall of the seal shoulder, such as at the flange. Additionally, the seal portion can comprise an annular seal lip that comprises substantially the same outer diameter as the seal shoulder. The seal lip can also comprise an internal channel configured to hold a dynamic gasket against the rotating shaft.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1A:
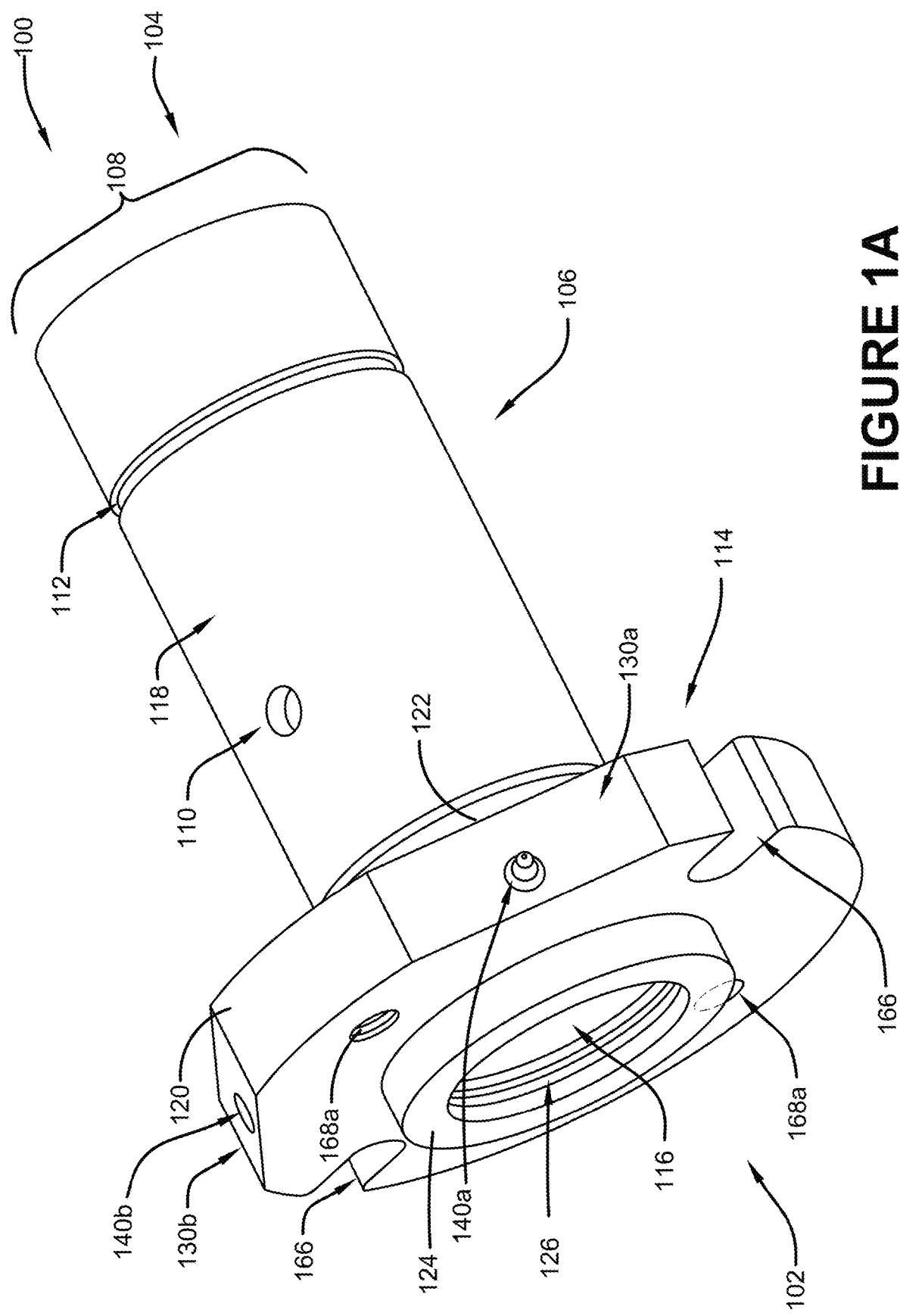
FIGS. 1A and 1B are component diagrams illustrating one implementation of an example barrier seal.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In one aspect, a barrier seal can be devised that comprises a one-piece combination seal and bushing for a rotating shaft pump, which fits in a seal or stuffing box of the rotating shaft pump to provide a dynamic bushing, and a fluid seal along the shaft. The combination seal and bushing barrier seal can comprise a tubular portion that fits inside the stuffing box, with dynamic and static seals disposed inside and outside the tubular portion to provide the fluid seal. A flange portion allows the barrier seal to be fastened to the pump bracket, to hold it stationary during operation; and an annular lip lies outside of the flange portion to provide another location for disposing a dynamic seal along the rotating pump shaft. Alternately, the dynamic seal at this location may be disposed inside the boundaries of the flange, but proximally from a lubrication inlet port. An external lubrication port on the barrier seal allows for lubricant to be injected to the inside of the seal, and an internal lubrication port allows for lubricant to move from the inside to the outside of the barrier seal. In this way, lubricant is provided internally for the bushing portion, and externally to mitigate pumped fluid leakage between the barrier seal and wall of the stuffing box.

Figure 1B:
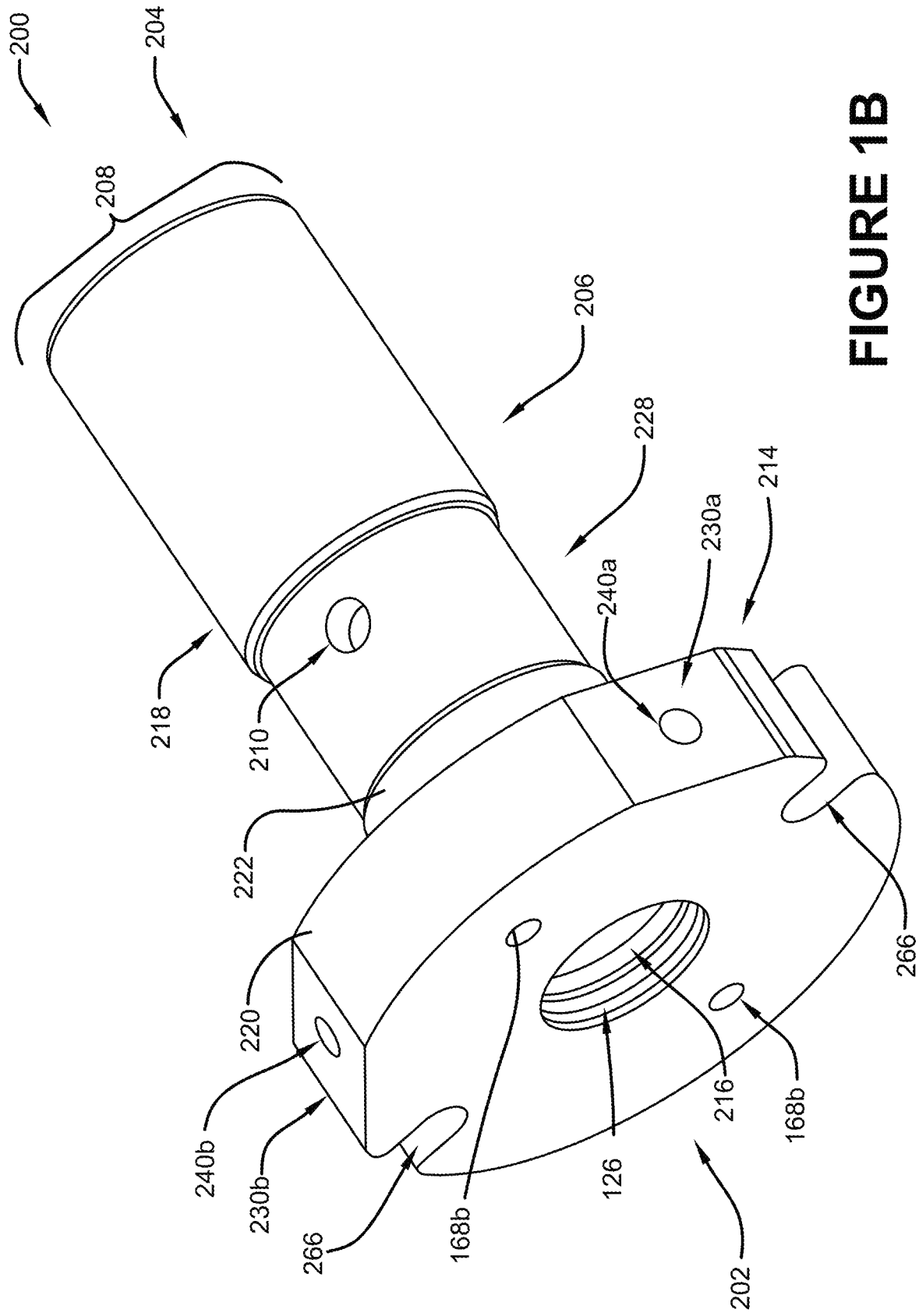

FIG. 1A is a component diagram that illustrates one example implementation of an exemplary barrier seal 100, as described herein; and FIG. 1B is an alternate implementation of a barrier seal 200. The example barrier seals 100, 200 respectively comprise a proximal end 102, 202 which is operably disposed proximally to a motor coupled to the pump shaft on which the barrier seal 100, 200 is disposed. The barrier seals 100, 200 also comprise a distal end 104, 204, which is operably disposed distally from the motor (e.g., at the pumping end of the pump, proximate pump chamber). A tube-shaped, bushing portion 106, 206 is disposed at the distal end 104, 204 and comprises an outer diameter that is substantially constant from the proximal end 102, 202 to the distal end 104, 204 of the bushing portion 106, 206. In alternate implementations, as shown in FIG. 1B, the bushing portion 206 can comprise a cut-out portion 228, illustrated as a step down, flat, and step up. In some implementations, the cut-out portion 228 may be implemented as a lubrication reservoir.

The bushing portion 106, 206 further comprises an interior lubrication port 110, 210 that fluidly couples the interior 116, 216 of barrier seal 100, 200 with the exterior 118, 218 of the barrier seal 100, 200. Additionally, in the seal 100, a first external gasket channel 112 is disposed around the exterior 118 of the bushing portion 106. It is configured to operably hold a static gasket (e.g., O-ring) in place, and against an interior wall of a stuffing box of a pump bracket into which it is installed. As an example, a gasket disposed in the first external gasket channel 112 can be used to mitigate leakage of pumped fluid along the interior of the stuffing box wall. The gasket disposed in the first external gasket channel 112 can also help hold lubricant in place around the exterior 118 of the bushing portion 106 (e.g., under pressure), which may also mitigate leakage of pumped fluid along the interior of the stuffing box wall.

Figure 2A:
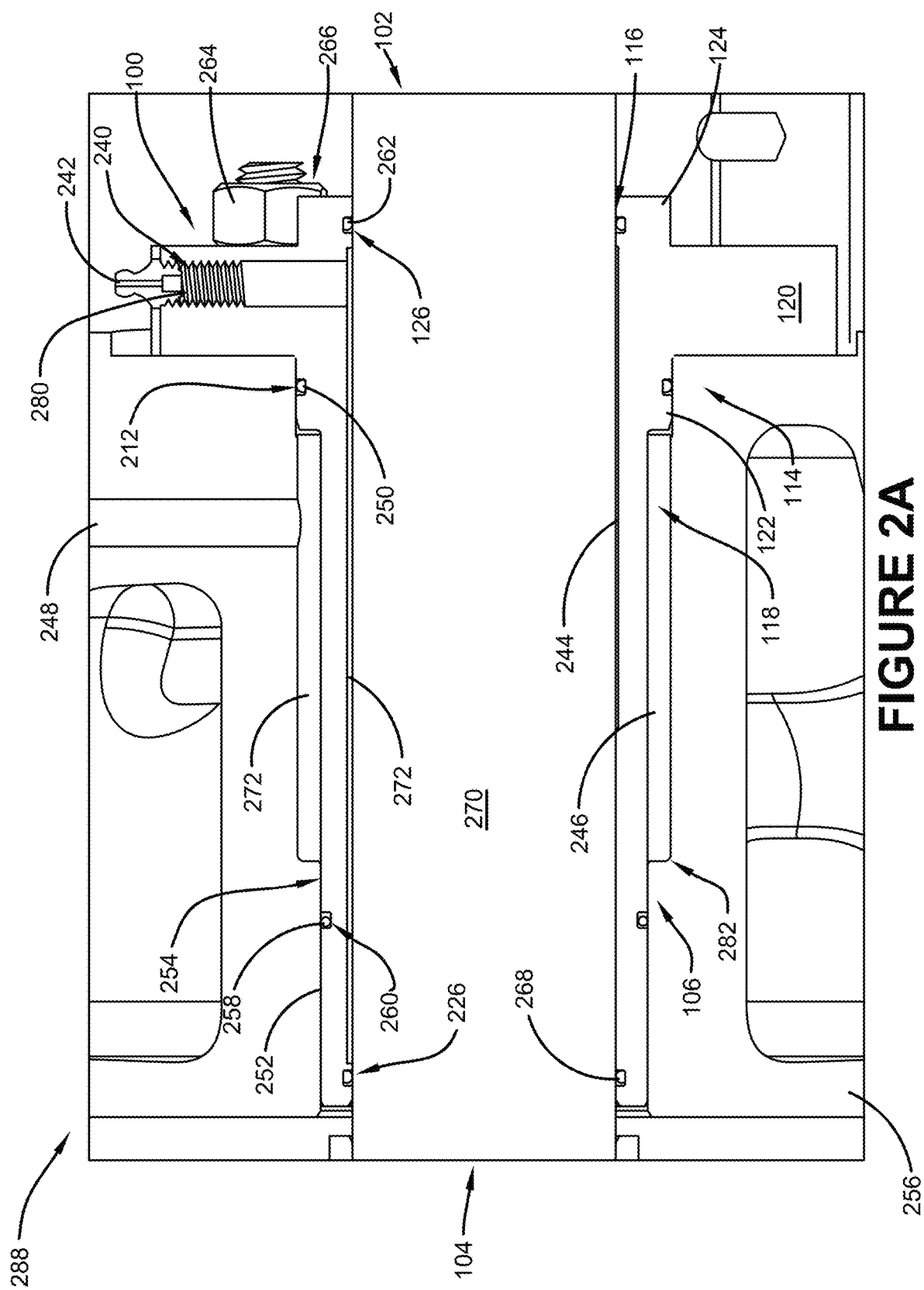
FIGS. 2A and 2B are component diagrams illustrating one implementation of an example barrier seal installed in a portion of an example pump.
Figure 2B:
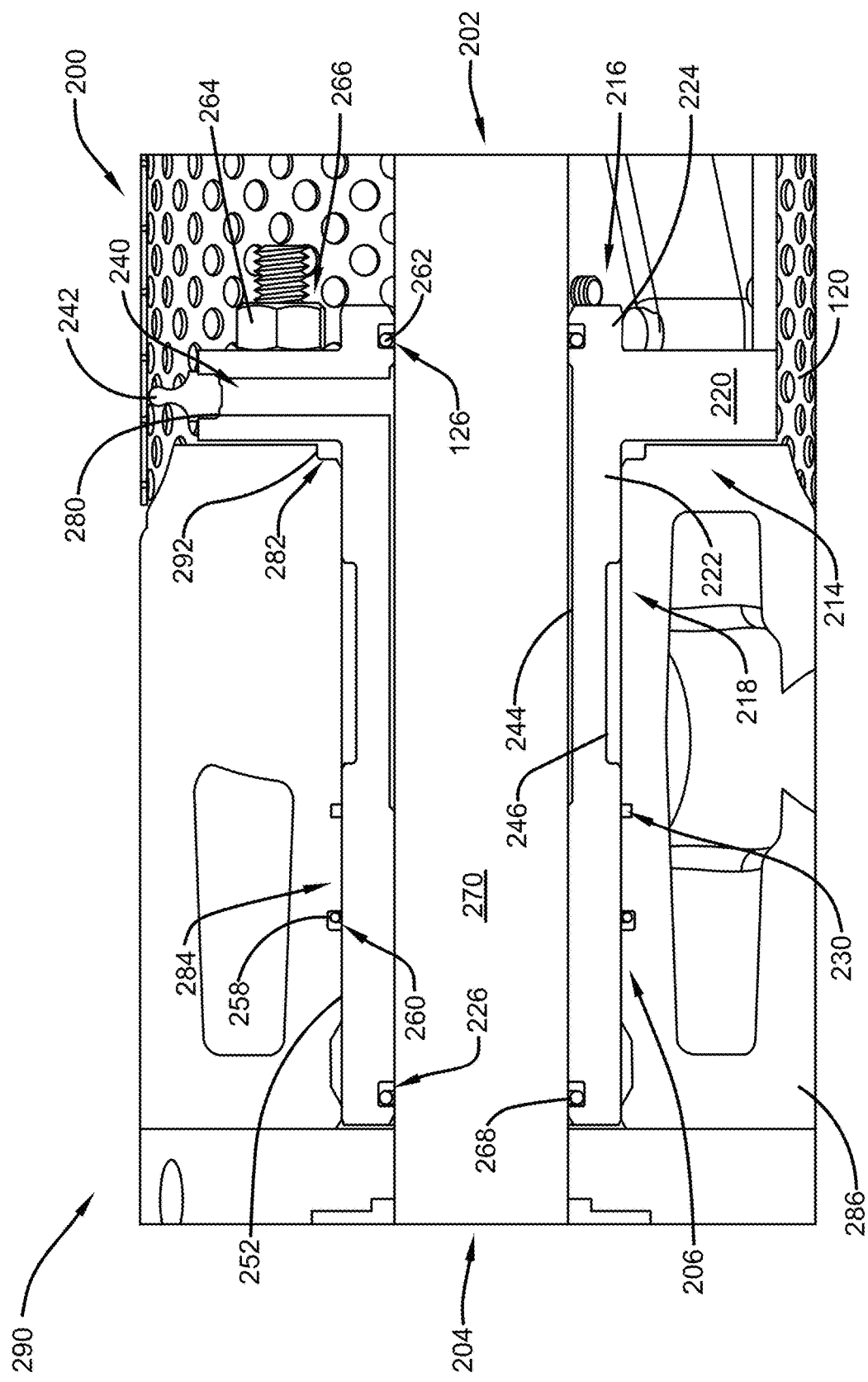

In FIG. 1A, 1B, and also shown in FIGS. 2A and 2B, a seal portion 114, 214 is disposed at the proximal end 102, 202 of the barrier seal 100, 200. The seal portion 114, 214 comprises a flange 120, 220 that projects outward radially from the center (e.g., central longitudinal axis) of the barrier seal 100, 200. In the seal 100, on the distal side of the flange 120, 220 is a seal shoulder 122, 222 that has a different diameter (e.g., larger) than the diameter 108, 208 of the tube portion 106, 206. Further, in 100 and 200, on the proximal side of the flange 120, 220 is an annular flange lip 124, 224 comprising substantially the same diameter as the seal shoulder 122, 222.

As shown in FIGS. 2A and 2B, which illustrates alternate implementations of a diagonal cut-away view of a portion of a pump 288, 290 respectively with the barrier seal 100, 200 installed. In FIG. 2A, a second external gasket channel 212 is disposed around the exterior 118 of the seal shoulder 122, of the seal portion 114. The second external gasket channel 212 is configured to operably hold a second static gasket 250 (e.g., O-ring) in place, and against an interior wall 252 of a stuffing box 254 of a pump bracket 256 into which it is installed. As an example, the second static gasket 250 disposed in the second external gasket channel 212 can be used to mitigate leakage of pumped fluid along the interior of the stuffing box wall 252. The second static gasket 250 disposed in the second external gasket channel 212 can also help hold lubricant in place around the exterior 118 of the bushing portion 106 (e.g., under pressure), in conjunction with a first static gasket 258 disposed in the first external gasket channel 260. Further, in the implementation illustrated in FIG. 2B, a retaining ring channel 230 can be disposed around the inner wall of the stuffing box 284. The retaining ring channel 230 can be configured to hold a retaining ring that can be used to hold a different component in the stuffing box.

In an alternate implementation, in FIGS. 2A and 2B, the pump 290 comprises a bracket 286 having a stuffing box 284 in which the example barrier seal 200 is disposed. In this example implementation, the bracket 286 comprises a gasket channel 282 positioned at the proximal end of the stuffing box 284. The gasket channel 282 is configured to operably hold a different seal in the stuffing box and in this configuration allows a gasket 292 (e.g., a flat gasket) to mitigate fluid leakage along the interior of the stuffing box wall 252. The gasket 292 between bracket 286 and flange 220 can also help hold lubricant in place around the exterior 118 of the bushing portion 106 (e.g., under pressure).

As illustrated in FIGS. 1A, 1B and FIGS. 2A and 2B, a first interior gasket channel 126, is disposed around the interior 116 wall of the flange lip 124. The first interior gasket channel 126, is configured to operably hold a first dynamic gasket 262 against the rotating shaft 270 of the pump. Further, the bushing portion 106, 206 of the barrier seal 100, 200 comprises a second interior gasket channel 226 disposed around the interior wall of the bushing portion 106, 206, at the distal end 104, 204. The second interior gasket channel 226 is configured to operably hold a second dynamic gasket 268 (e.g., O-ring) against the rotating shaft 270 of the pump. In this example, the dynamic gaskets 262, 268 are configured to be subjected to the rotation of the pump, while remaining in place in their respective interior channels 126, 226. Further, the respective dynamic gaskets 262, 268 disposed in the interior channels 126, 226 can help hold lubricant 272 between the interior 116 walls of the barrier seal 100 and the rotating shaft 270 of the pump, while mitigating leakage of pumped fluid along the shaft 270, as will be described in more detail below.

Additionally, as illustrated in FIGS. 1A, B and 2A, B, the barrier seals 100, 200 can comprise a lubrication inlet port 240 (e.g., 240a, 240b) disposed in the flange 120, 220 of the seal portion 114, 214. The lubrication inlet port 240 can be configured to selectably receive a fluid pressure fitting 242 (e.g., a grease or lubrication fitting or nipple), such as by using a threaded coupling. That is, for example, a lubricant fitting 242 can comprise exterior threads, and the lubrication inlet port 240 can comprise interior threads 280, and the lubricant fitting 242 can be selectably threaded into the lubrication inlet port 240 such that lubricant 272 can be injected into the lubrication inlet port 240 under pressure (e.g., using a grease gun, or the like). In some implementations, the lubrication inlet port 240 can be fluidly coupled with an interior lubrication channel 244 that is disposed in the internal 116, 216 wall of the barrier seal 100, 200, between the respective interior channels 126, 226 (e.g., and dynamic gaskets 262, 268).

In this implementation, the interior lubrication port 110, 210 fluidly couples the interior lubrication channel 244, in the interior 116, 216 of barrier seal 100, 200, with and exterior lubrication channel 246 at the exterior 118 of the barrier seal 100, 200. As illustrated in FIG. 2A, the exterior lubrication channel 246 can be formed by the shoulder 122 of the seal portion 114, and a bracket shoulder 282 formed in the packing/stuffing box 254 of the pump bracket 256. As another example, in FIG. 2B, the exterior lubrication channel 246 can be formed by a cut-out 128, 228 in the exterior wall 118, 218 of the seal portion 114, 214, and may run between the shoulder 220 to at least partway down the length of the distal portion 204 of the bushing portion 206. As an illustrative example, lubricant 272 can be injected into the lubrication inlet port 240 by coupling a lubricant injector to the lubricant fitting 242.

In this example, the injected lubricant 272 can flow into the interior lubrication channel 244 to operably provide lubrication between the rotating pump shaft 270 and the interior 116 walls of the barrier seal 100, 200. Further in this example, the lubricant 272 can flow through the interior lubrication port 110, 210 to the exterior lubrication channel 246 to provide lubrication to, and mitigate leakage between, the exterior 118 of the barrier seal and the interior walls 252 of the stuffing box 254, 284. As an example, the lubricant can be operably held in place under pressure, where a pressure fitting (364 shown in FIGS. 3A and 3B below) can be installed at the lubrication outlet port 248. The pressurized lubricant, held between the respective static gaskets 212, 258, for example, can help mitigate leakage of pumped fluid along the shaft 270.

Figure 3A:
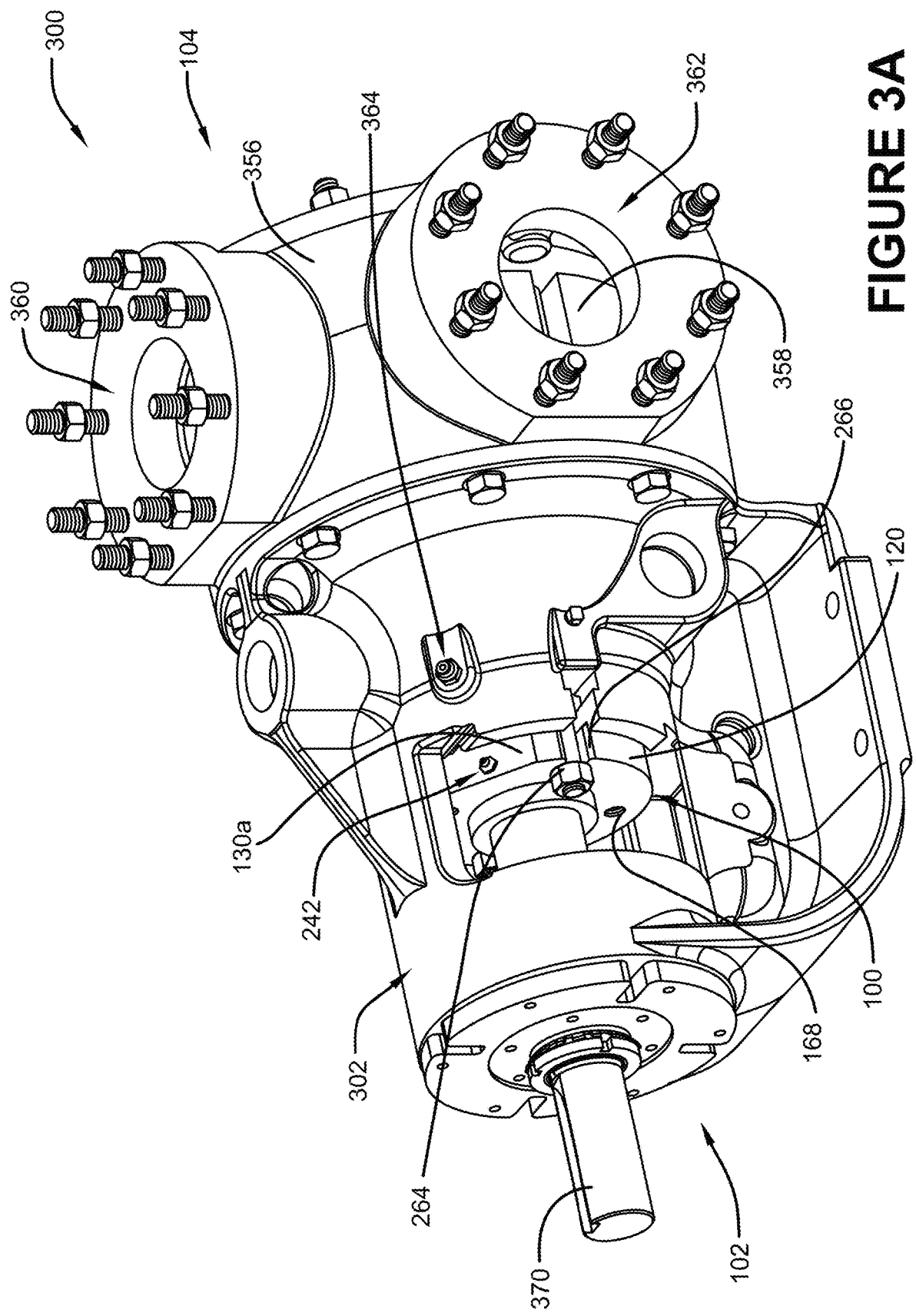
FIGS. 3A and 3B are component diagrams illustrating one example implementation where one or more portions of one or more systems and devices described herein may be utilized.
Figure 3B:
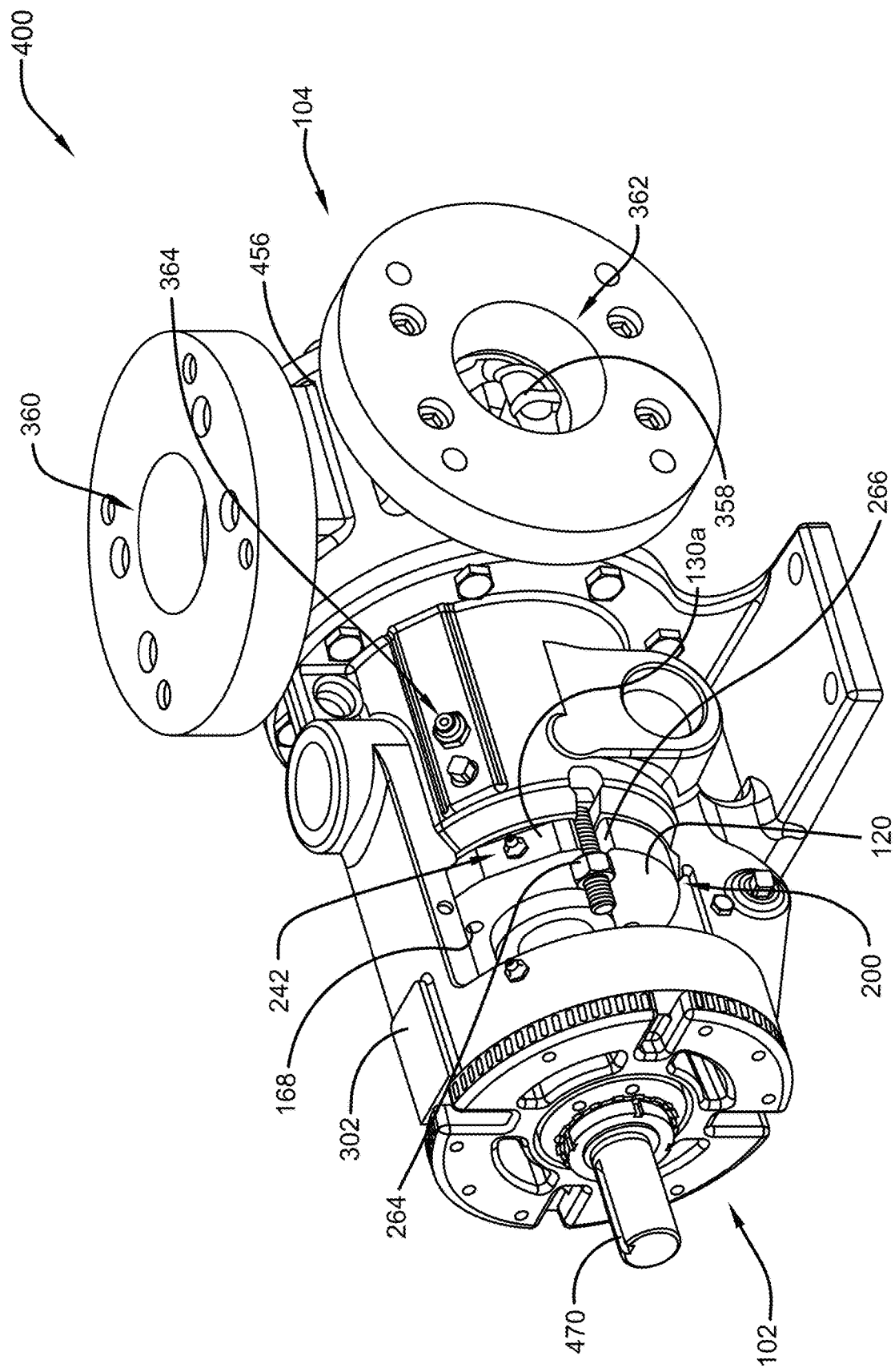
Figure 4A:
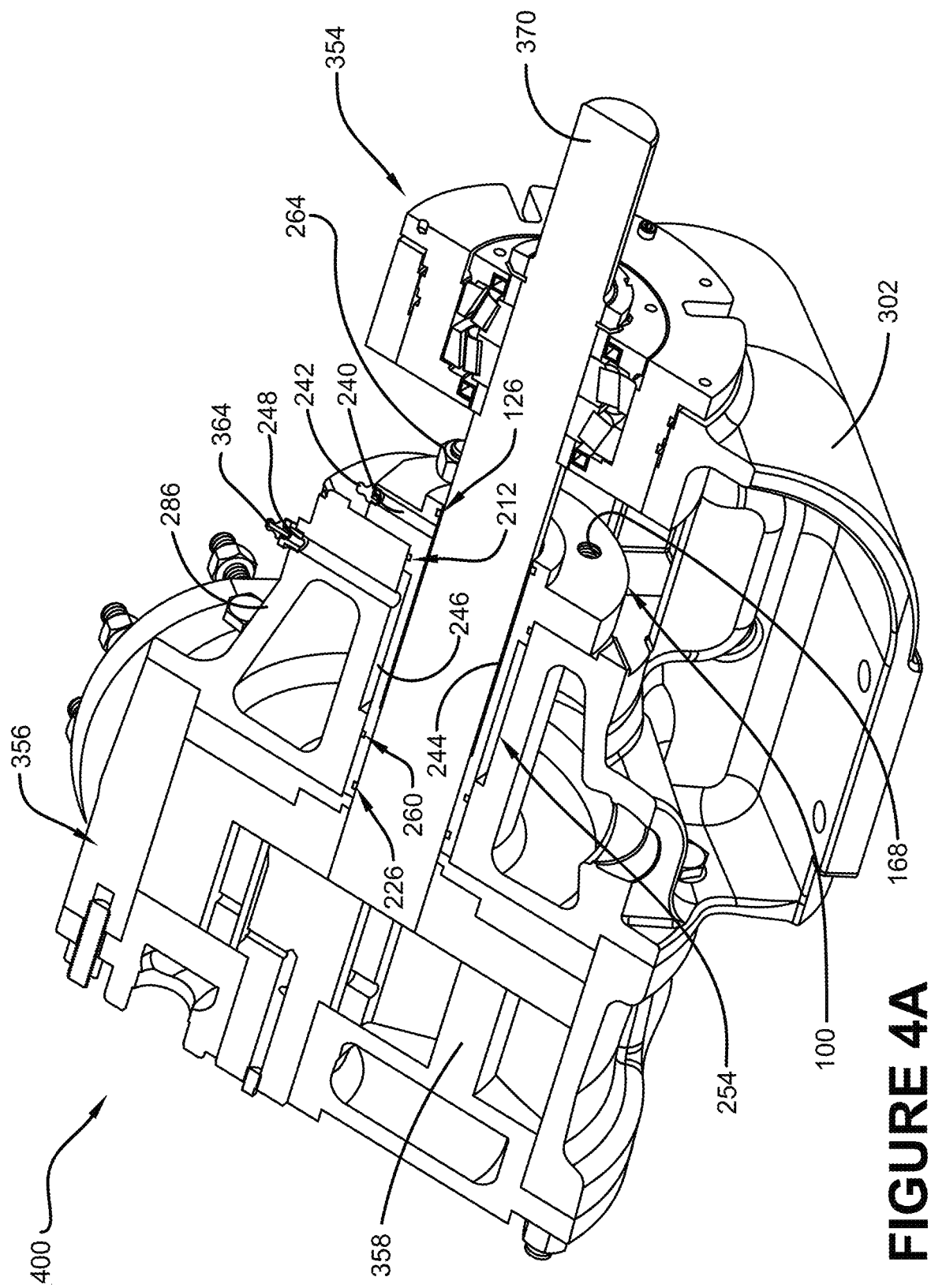
FIGS. 4A and 4B are component diagrams illustrating one example implementation where one or more portions of one or more systems and devices described herein may be utilized.
Figure 4B:
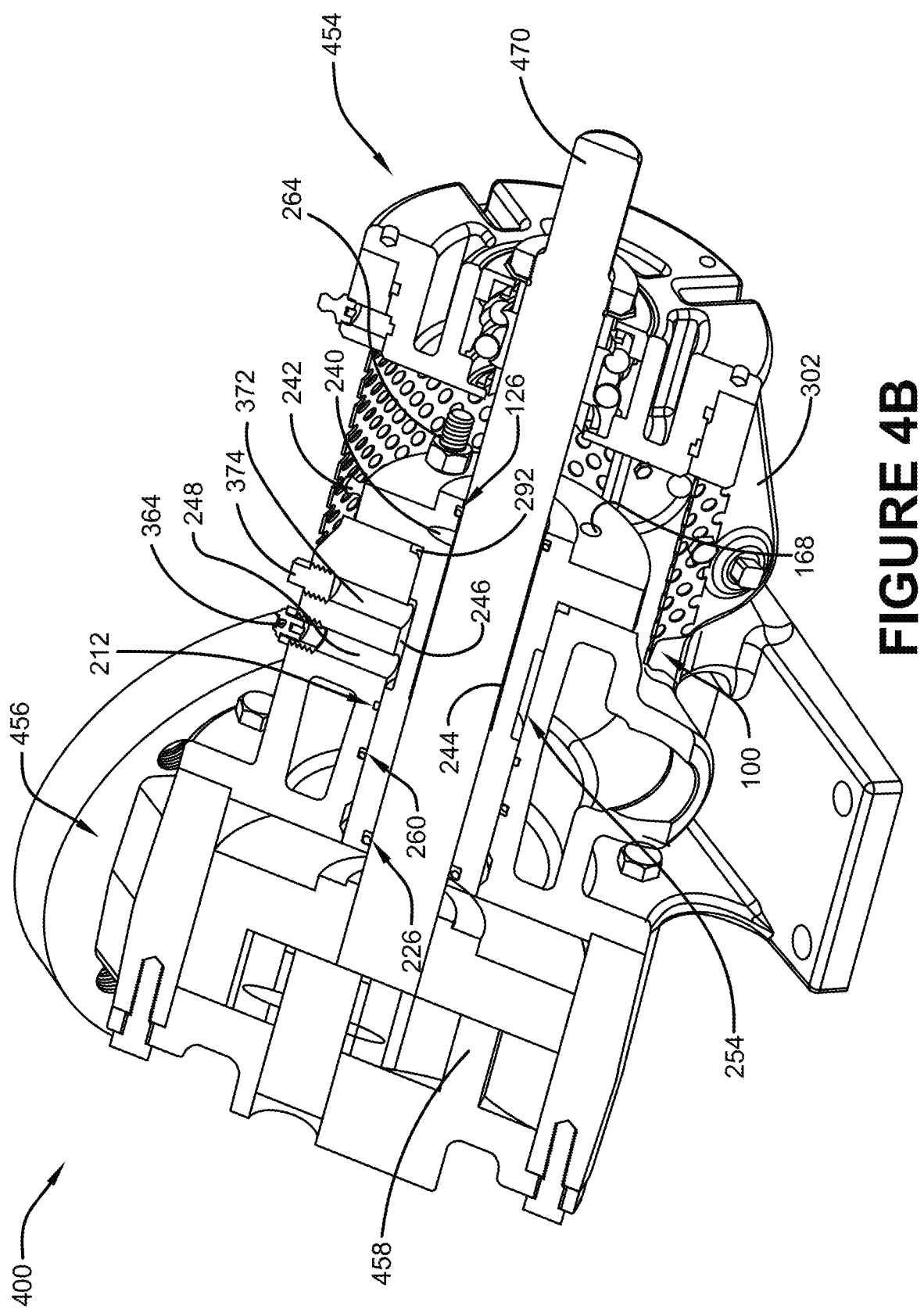

In alternate implementations, as illustrated in FIGS. 3B and 4B, an alternate lubrication inlet port 372 can be disposed distally from the flange 220, in the body of the bracket 286, and fluidly couple with the exterior lubrication channel 246. The lubrication outlet port 248 can also be fluidly coupled with the exterior lubrication channel 246. The inlet port 372 can have a plug or filler plug 374 selectably fitted in the opening, and the outlet port may have a valved discharge plug 264 (e.g., with an indicator) to allow lubricant to be emitted, and/or provide indication of a loss of pressure.

As illustrated in FIGS. 1A and 1B, in some implementations, the flange 120, 220 can comprise one or more chamfers 130a, 230a, 130b, 230b. The chamfer(s) 130a, 230a, 130b, 230b can comprise cut-outs from the annular shape of the flange 120, 220 (e.g., cut-out an arc portion of the flange 120, 220), and can respectively comprise optional locations for the lubrication inlet port 240a, 240b. That is, for example, depending on the way that the pump and/or pump bracket is set up, the user has an option to locate the fluid inlet port at either location 240a, 240b, depending on accessibility to the port. As an example, a pressure fitting (e.g., 242) can be fitted to one port location 240a, 240b, and a cap seal can be fitted to the other location 240a, 240b. In this way, in this example, pressurized fluid can be injected into the port 240, and the seal at the other location can mitigate leakage from that location. Further, the chamfers 130a, 230a, 130b, 230b may provide for access to the port 240 when installed on the pump, as described further, below; and can allow for installation of the barrier seal while a pressure fitting is installed.

Figure 5A:
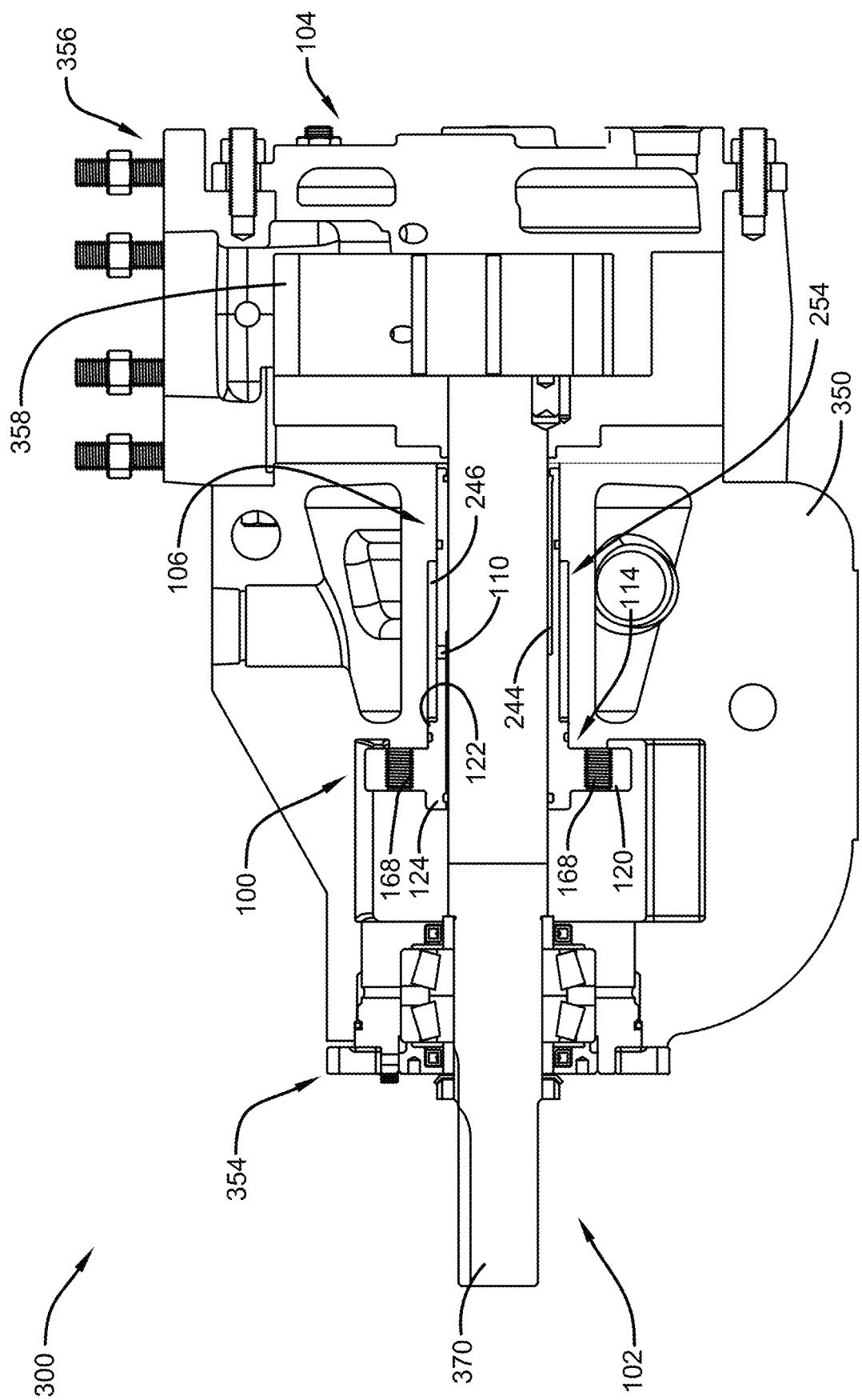
FIGS. 5A and 5B are component diagrams illustrating one example implementation where one or more portions of one or more systems and devices described herein may be utilized.
Figure 5B:
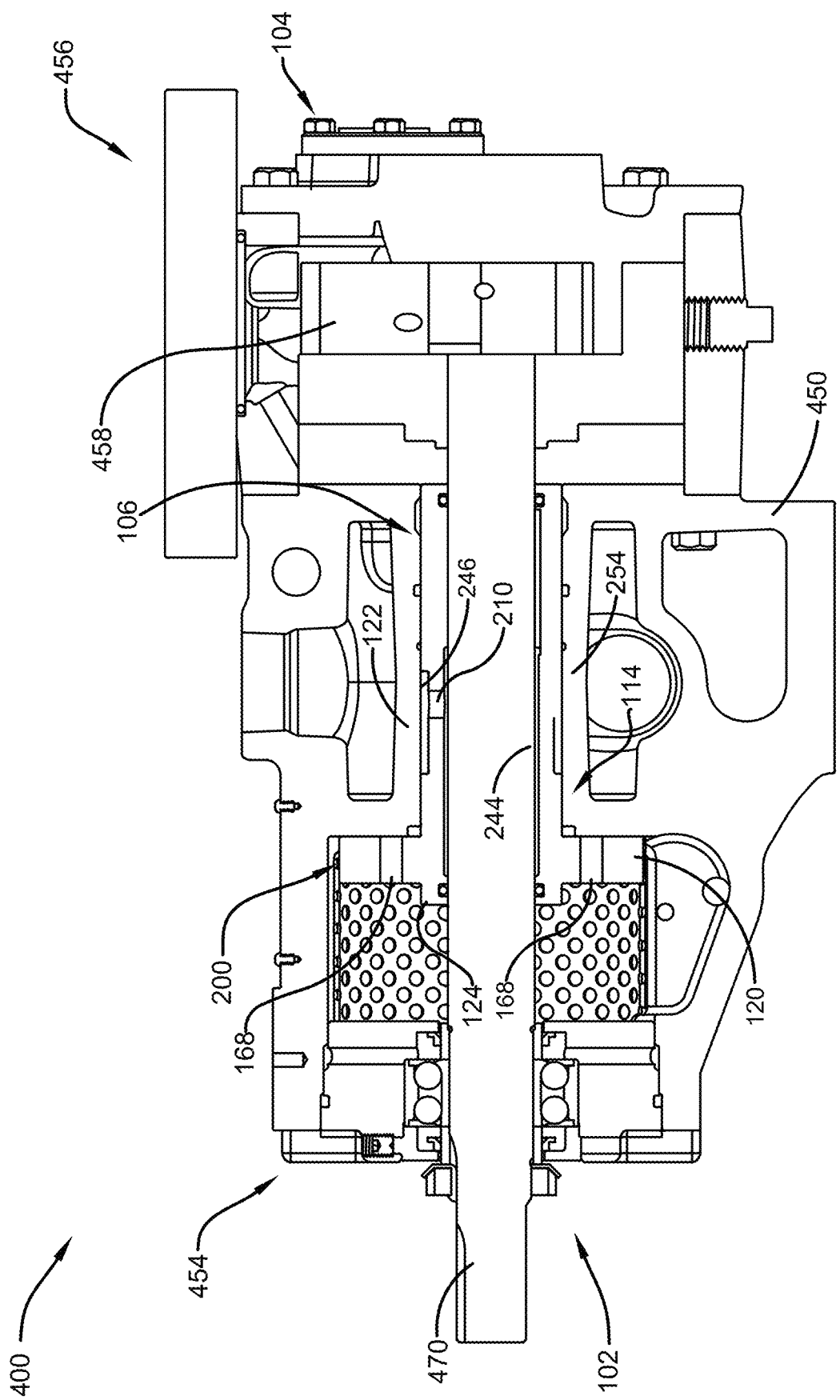
Figure 6:
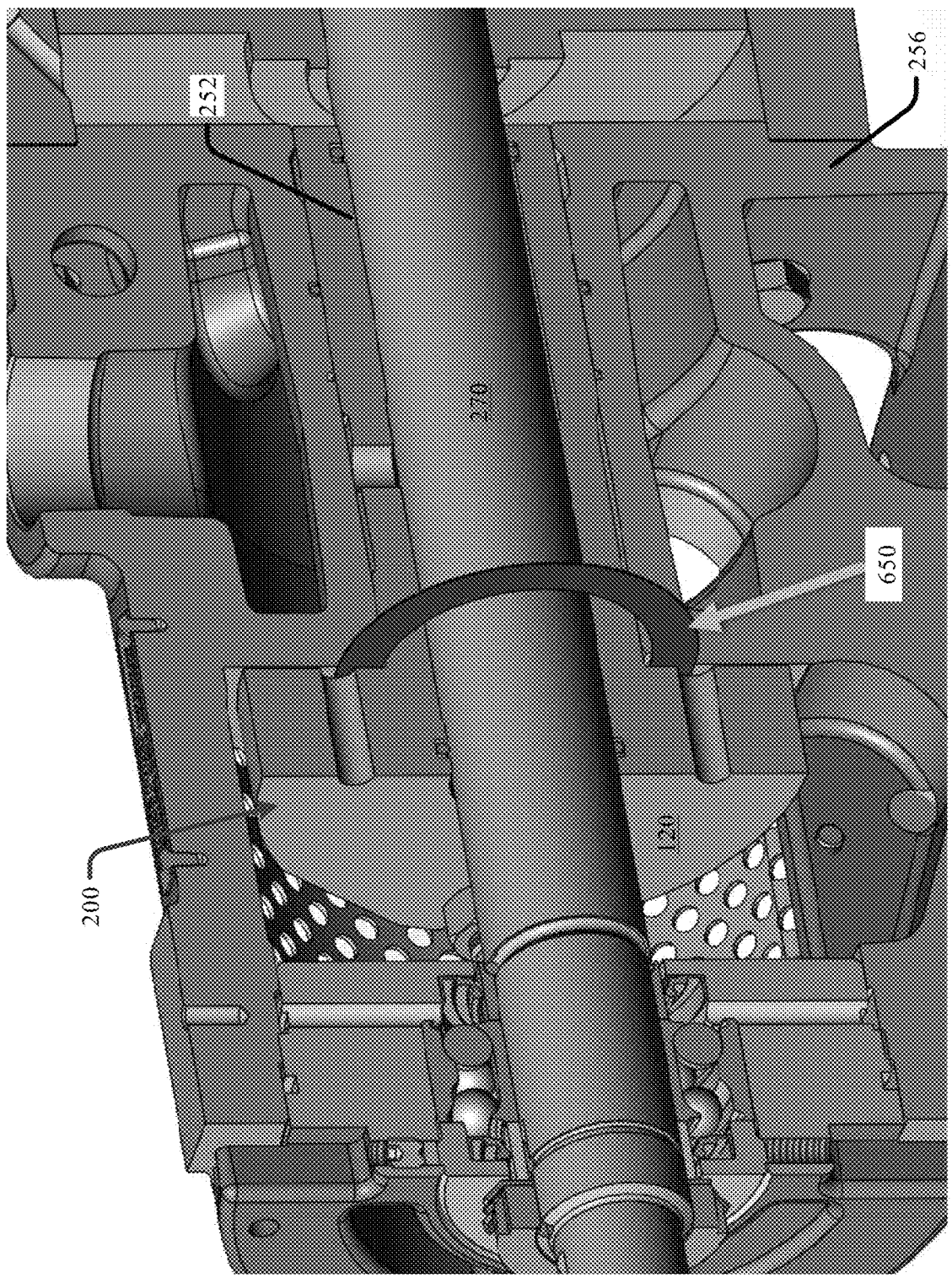
FIG. 6 is a component diagram that illustrates one example implementation of a system that utilizes one or more portions of one or more systems described herein.

FIGS. 3A, 3B, 4A, 4B, 5A, 5B, and 6 are a component diagrams that illustrates alternate examples of how an exemplary one-piece, combination seal and bushing, barrier seal 100, 200 may be implemented in an example pump 300, 400. FIGS. 3A and 3B illustrate a perspective view of the pumps 300, 400 with the barrier seal 100, 200 respectively; FIGS. 4A and 4B illustrate a cut-away view of the pumps 300, 400, respectively, along a diagonal (e.g., approximately forty-five degrees, along the axis of the lubrication ports) plane, with the barrier seals 100, 200 disposed therein; and FIGS. 5A and 5B illustrate a cut-away view of the pumps 300, 400 respectively, along a vertical plane, with the barrier seals 100, 200 disposed therein. In one implementation, as illustrated in FIG. 6, in one implementation, a flat gasket can be disposed between the bracket 256 of the pump, and the flange 120 of the barrier seal 200.

As illustrated in FIGS. 3A, 3B, 4A, 4B, 5A, and 5B, with continued reference to FIGS. 1A, 1B, 2A, and 2B, a pump 300, 400 comprises a pump bracket 302, 350, 450 that houses the pump shaft 370, 470, which may be flat or curved, or other geometric configuration chosen with sound engineering judgment. The pump 300, 400 may further comprise a shaft bearing assembly 354, 454 for supporting the rotating shaft 370, 470, and a pump chamber 356, 456 that houses a pump rotor 358, 458 to pump fluid, and pump inlet and outlet ports 360, 362 into and out of which fluid is pumped. A grease fitting 242 is disposed in the lubrication inlet port 240, at a first port location 240a. As described above, for example, the grease fitting 242 could alternately be disposed at a second port location 240b. A pressure cap 364 is installed on the lubrication outlet port 248, and can comprise an indicator that shows when the lubricant pressure is at normal operation, and when lubricant pressure is outside a pressure threshold (e.g., lower than operational pressure). For example, when the pressure cap indicator indicates that the pressure is below a normal operating pressure, this may be an indication that one of the gaskets (e.g., 126, 226, 250, 258, 292) has failed (e.g., ruptured, displaced, etc.), and/or that there is not sufficient lubricant 272 in the barrier seal 100, 200 for desired operation. Additionally, the pressure cap 364 may also provide for a pressure relief when the lubricant is over pressurized in the barrier seal 100, 200.

As illustrated, the chamfer 130a, on which the grease fitting 242 is disposed, may allow for installation of the barrier seal 100 through the proximal end 102 of a pump bracket 302, such as through the opening for the bearing assembly 354, 454. That is, for example, the cut out portion that defines the chamfer 130a provides sufficient relief from the surface of the flange 120, 220 to allow the grease fitting 242 to pass through the opening for the bearing assembly 354, 454. Additionally, the barrier seal 100, 200 can be selectably fastened to the pump bracket 302 using one or more seal fasteners 264 that pass through fastener receivers 266 disposed in the flange 120, 220. As an example, the seal fasteners 264 can comprise a bolt that is threaded into a complementary threaded hole in the bracket 302, or may comprise a bolt extending from the bracket 302 and fastened with a nut at the face of the flange 120, 220. It is contemplated that other fastening means may be utilized, as devised by sound engineering principles, for the purpose of providing a compressive force toward the distal end 104 of the stuffing box 254.

As illustrated in the FIGURES the proximal side 102 of the flange 120, 220 comprises a removal tool attachment receiver 168a, b. In some implementations, the removal tool attachment receiver 168 can comprise an opening in the face of the flange 120, 220 that is configured to receive a tool (not shown) that facilitates removal of the barrier seal 100, 200 from the stuffing box 254 of the pump bracket 302. As an example, the removal tool attachment receiver 168 can comprise one or more threaded holes into which a threaded end of a tool can be threadedly engaged. In this example, when the removal tool is engaged with the flange 120, 220, the barrier seal 100, 200 can be pulled, or otherwise removed, from the stuffing box 254, such as from gasket replacement, repair, or otherwise replacing the barrier seal.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A barrier seal that operably fits in a stuffing box with a rotating shaft of a rotating shaft pump to mitigate fluid migration along the shaft, comprising:
   a one-piece body comprising a proximal end and a distal end, and comprising:
      a bushing portion extending from the distal end of the body to a flange at the proximal end of the body, the bushing portion comprising:
         a substantially uniform outer diameter that is configured to operably fit inside the stuffing box of the rotating shaft pump such that the outer diameter of the bushing portion is configured to engage a first seal located in a first channel disposed around an inner wall of the stuffing box;
         an exterior lubrication channel formed along the outer diameter of the bushing portion such that the substantially uniform outer diameter of the bushing portion is interrupted only by the exterior lubrication channel as the bushing portion extends from the distal end to the flange;
         a substantially uniform inner diameter that is configured to operably fit around the rotating shaft of the rotating shaft pump;
         an internal fluid port that fluidly couples an interior lubrication channel with the exterior lubrication channel of the bushing portion;
         an annular interior channel disposed at the distal end around an interior wall, the interior channel configured to hold a dynamic gasket against the rotating shaft; and
      a seal portion comprising the proximal end of the body, the seal portion comprising:
         the flange that projects radially outward from a central longitudinal axis of the body, the flange comprising an exterior and interior wall, the interior wall configured to be adjacent the rotating shaft;
         a flange port that fluidly couples the exterior with the interior wall, wherein the interior lubrication channel fluidly coupled with the flange port.

2. The seal of claim 1, the seal portion comprising an annular interior channel disposed at the proximal end, proximally from the flange, around an interior wall of the flange, the interior channel configured to hold a dynamic gasket against the rotating shaft.

3. The seal of claim 1, wherein the uniform outer diameter of the bushing portion is further configured to engage a second seal located in second a channel disposed around the inner wall of the stuffing box, wherein the first channel and the second channel are spaced from one another and are substantially the same diameter.

4. The seal of claim 1, the flange port comprising an inlet port and an outlet port, respectively fluidly coupled with the interior lubrication channel.

5. The seal of claim 4, the inlet port comprising a one-way lubrication inlet valve, and the outlet comprising a pressure cap that is configured to indicate a loss of pressure and/or provide for pressure relief.

6. The seal of claim 1, wherein the flange is configured to be selectably fastened to a pump bracket of the rotating pump.

7. The seal of claim 1, wherein a proximal face of the flange comprises a removal tool attachment receiver configured to receive a seal removal tool.

8. A barrier seal device that provides for fluid migration mitigation along a rotating shaft of a rotating shaft pump, comprising:
   a one-piece body comprising a seal portion at a proximal end, a bushing portion at a distal end, and an internal fluid port that fluidly couples an interior of the body with an exterior of the body;

wherein the bushing portion comprises a substantially uniform outer diameter that is configured to fit inside a stuffing box of the rotating shaft pump such that the outer diameter of the bushing portion is configured to engage a first seal located in a first channel disposed around an inner wall of the stuffing box, an exterior lubrication channel formed along the outer diameter of the bushing portion such that the substantially uniform outer diameter of the bushing portion is interrupted only by the exterior lubrication channel as the bushing portion extends from the distal end to the proximal end, and a substantially uniform inner diameter that allows for dynamic rotation of the shaft, the bushing portion comprising an annular interior channel disposed at the distal end around an interior wall, for operably holding a dynamic gasket against the rotating shaft; and wherein the seal portion comprises a flange that projects radially outward from a central longitudinal axis of the body, the flange comprising an exterior face and an interior wall, the interior wall adjacent the rotating shaft, and a flange port that fluidly couples the exterior face with interior wall.

9. The device of claim 8, wherein the seal portion comprises an interior lubrication channel fluidly coupled with the flange port and interior wall.

10. The seal of claim 8, wherein the seal portion comprises an annular interior channel disposed at the proximal end, proximally from the flange, around an interior wall of the flange, the interior channel configured to hold a dynamic gasket against the rotating shaft.

11. The seal of claim 8, wherein the uniform outer diameter of the bushing portion is further configured to engage a second seal located in second a channel disposed around the inner wall of the stuffing box, wherein the first channel and the second channel are spaced from one another and are substantially the same diameter.

12. The seal of claim 9, wherein the flange port comprises an inlet port and an outlet port, respectively fluidly coupled with the interior lubrication channel.

13. A barrier seal that operably fits in a stuffing box with a rotating shaft of a rotating shaft pump to mitigate fluid migration along the shaft, comprising:

a one-piece body comprising a proximal end and a distal end, and comprising:

a bushing portion comprising the distal end of the body, the bushing portion comprising:

a substantially uniform outer diameter that is configured to operably fit inside the stuffing box of the rotating shaft pump such that the outer diameter of the bushing portion is configured to engage a first seal located in a first channel disposed around an inner wall of the stuffing box;

an exterior lubrication channel formed along the outer diameter of the bushing portion such that the substantially uniform outer diameter of the bushing portion is interrupted only by the exterior lubrication channel as the bushing portion extends from the distal end to the proximal end;

a substantially uniform inner diameter that is configured to operably fit around the rotating shaft of the rotating shaft pump;

an internal fluid port that fluidly couples an interior lubrication channel with the exterior lubrication channel of the bushing portion;

an annular interior channel disposed at the distal end around an interior wall, the interior channel configured to hold a dynamic gasket against the rotating shaft; and a seal portion comprising the proximal end of the body, the seal portion comprising:

a flange that projects radially outward from a central longitudinal axis of the body, the flange comprising an exterior and interior wall, the interior wall adjacent the rotating shaft;

a flange port that fluidly couples the exterior with the interior wall, the flange port comprising an inlet port and an outlet port, respectively fluidly coupled with the interior lubrication channel, wherein the exterior lubrication channel is fluidly coupled with the internal fluid port; and an annular interior channel disposed at the proximal end, proximally from the flange, around an interior wall of the flange, the interior channel configured to hold a dynamic gasket against the rotating shaft.

* * * * *